(12) United States Patent
Shirai et al.

(10) Patent No.: US 7,528,218 B2
(45) Date of Patent: May 5, 2009

(54) POLYESTER FOR TONER

(75) Inventors: Eiji Shirai, Wakayama (JP); Tetsuya Ueno, Wakayama (JP)

(73) Assignee: Kao Corporation, Tokyo (JP)

( * ) Notice: Subject to any disclaimer, the term of this patent is extended or adjusted under 35 U.S.C. 154(b) by 162 days.

(21) Appl. No.: 11/559,711

(22) Filed: Nov. 14, 2006

(65) Prior Publication Data

US 2007/0135615 A1    Jun. 14, 2007

(30) Foreign Application Priority Data

Dec. 12, 2005  (JP) .............................. 2005-357910

(51) Int. Cl.
*C08G 63/02* (2006.01)
*C08G 63/00* (2006.01)

(52) U.S. Cl. ................. 528/272; 430/108.4; 430/109.2; 430/109.4; 524/99; 524/445; 524/492; 524/589; 524/599; 528/271

(58) Field of Classification Search ............... 430/108.4, 430/109.2, 109.4; 524/99, 445, 492, 589, 524/599; 528/271, 272
See application file for complete search history.

(56) References Cited

U.S. PATENT DOCUMENTS

| 2,652,367 | A | * | 9/1953 | Adelson | ..................... 508/328 |
| 5,747,596 | A | * | 5/1998 | Emert et al. | ................. 525/298 |
| 5,807,654 | A | | 9/1998 | Kubo et al. | |
| 5,872,149 | A | * | 2/1999 | Dralle-Voss et al. | ........ 514/533 |
| 6,103,438 | A | | 8/2000 | Kubo et al. | |
| 6,818,699 | B2 | * | 11/2004 | Kajimaru et al. | ............ 524/845 |
| 7,385,002 | B2 | | 6/2008 | Shirai et al. | |
| 2003/0040645 | A1 | * | 2/2003 | Krill et al. | .................. 568/390 |
| 2005/0271963 | A1 | | 12/2005 | Shirai et al. | |

FOREIGN PATENT DOCUMENTS

| GB | 1018982 | * | 2/1966 |
| JP | 5-27480 | | 2/1993 |
| JP | 6-27728 | | 2/1994 |
| JP | 8-30025 | | 2/1996 |
| JP | 2000-35695 | | 2/2000 |
| JP | 2000-214633 | | 8/2000 |
| JP | 2002-333736 | | 11/2002 |
| JP | 2005-350511 | | 12/2005 |

* cited by examiner

*Primary Examiner*—Terressa M Boykin
(74) *Attorney, Agent, or Firm*—Oblon, Spivak, McClelland, Maier & Neustadt, P.C.

(57) ABSTRACT

The present invention relates to a polyester for a toner, obtained by polycondensing an alcohol component and a carboxylic acid component containing an alkylsuccinic acid having 10 or more carbon atoms, an alkenylsuccinic acid having 10 or more carbon atoms, or a mixture thereof, in an amount of from 0.5 to 50% by mole, wherein each of 6-methyl-2-heptanone and 5-methyl-2-heptanone is detected in an amount of 0.5 ppm or less as determined by thermal desorption-gas chromatography-mass spectrometry. The polyester for a toner of the present invention is used as a resin binder, or the like, for a toner used, for example, for developing electrostatic latent images formed in electrophotography, electrostatic recording method, electrostatic printing method, or the like.

14 Claims, No Drawings

POLYESTER FOR TONER

FIELD OF THE INVENTION

The present invention relates to a polyester for a toner used, for example, for developing electrostatic latent images formed in electrophotography, electrostatic recording method, electrostatic printing method or the like, a process for producing the polyester, and a toner containing the polyester.

BACKGROUND OF THE INVENTION

A toner used for an electrophotographic system, especially, an electrophotographic system using a heat roller fixing system, has been desired to have excellent low-temperature fixing ability and offset resistance. In view of the above, JP2000-35695 A discloses that a polyester resin obtained by using an alkylsuccinic acid, an alkenylsuccinic acid, or a mixture thereof, each having 10 or more carbon atoms, is excellent in low-temperature fixing ability and offset resistance.

SUMMARY OF THE INVENTION

The present invention relates to:

(1) a polyester for a toner, obtained by polycondensing an alcohol component and a carboxylic acid component containing an alkylsuccinic acid having 10 or more carbon atoms, an alkenylsuccinic acid having 10 or more carbon atoms, or a mixture thereof, in an amount of from 0.5 to 50% by mole, wherein each of 6-methyl-2-heptanone and 5-methyl-2-heptanone is detected in an amount of 0.5 ppm or less as determined by thermal desorption-gas chromatography-mass spectrometry;

(2) a process for producing a polyester for a toner, including the step of polycondensing an alcohol component and a carboxylic acid component containing an alkylsuccinic acid having 10 or more carbon atoms, an alkenylsuccinic acid having 10 or more carbon atoms, or a mixture thereof, in an amount of from 0.5 to 50% by mole, wherein water is added to a reaction system at a temperature of from 100° to 300° C. during, after, or during and after the reaction of an alcohol component and an alkylsuccinic acid having 10 or more carbon atoms, an alkenylsuccinic acid having 10 or more carbon atoms, or a mixture thereof, in an amount of from 0.1 to 50 parts by weight, based on 100 parts by weight of the polyester obtained; and (3) a toner containing the polyester for a toner as defined in the above (1).

DETAILED DESCRIPTION OF THE INVENTION

A toner containing a polyester obtained by using an alkylsuccinic acid having 10 or more carbon atoms, an alkenylsuccinic acid having 10 or more carbon atoms, or a mixture thereof, has a disadvantage of staining in the machine in an electrophotographic system, in particular, staining of a charging member, such as corotron or scorotron.

The present invention relates to a polyester for a toner which is excellent in low-temperature fixing ability and offset resistance, and also capable of reducing staining in the machine, and a process for producing the polyester, and a toner containing the polyester.

The polyester for a toner of the present invention is excellent in low-temperature fixing ability and offset resistance, and also exhibits an excellent effect of being capable of reducing staining in the machine.

These and other advantages of the present invention will be apparent from the following description.

The polyester for a toner of the present invention is a polyester for a toner obtained by polycondensing an alcohol component and a carboxylic acid component containing an alkylsuccinic acid, an alkenylsuccinic acid, or a mixture thereof, each having 10 or more carbon atoms, and has a feature that 6-methyl-2-heptanone and 5-methyl-2-heptanone are detected in an amount within a certain range as determined by thermal desorption-gas chromatography-mass spectrometry (TD-GC/MS). The polyester obtained by using an alkylsuccinic acid, an alkenylsuccinic acid, or a mixture thereof as raw materials monomers is more likely to cause staining in the machine in an electrophotographic system, while being excellent in low-temperature fixing ability and offset resistance. In view of the above, as a result of studies, the present inventors have found that staining in the machine is caused by a volatilization of impurities and the like in a toner by temperature elevation in the machine during image printing. As a result of further studies, it has been found that staining in the machine can be suppressed if specified ketone components which are volatile under specified temperature conditions, specifically, 6-methyl-2-heptanone and 5-methyl-2-heptanone, are reduced.

In the present invention, the thermal desorption-gas chromatography-mass spectrometry (TD-GC/MS) which is used for the detection of 6-methyl-2-heptanone, 5-methyl-2-heptanone, or a mixture thereof detects a component, which is volatized while heating, by way of trapping (heat-desorbing) the component, separating the trapped component into each component by gas chromatography, and performing mass spectrometry. In the present invention, a sample is heated under the conditions similar to the environment in the machine, specifically, heated at a temperature of 120° C. for 1 hour, and whereby 6-methyl-2-heptanone and 5-methyl-2-heptanone which are causative of staining in the machine can be detected by using TD-GC/MS as a measuring means under the above conditions.

A detected amount of 6-methyl-2-heptanone and 5-methyl-2-heptanone is each 0.5 ppm or less, preferably 0.3 ppm or less, and more preferably 0.1 ppm or less. A total detected amount of 6-methyl-2-heptanone and 5-methyl-2-heptanone is preferably 1.0 ppm or less, and more preferably 0.6 ppm or less.

Further, the polyester according to the present invention has a ratio of a total peak area attributed to ketone compounds having 4 to 8 carbon atoms (KS) and a peak area attributed to acetone (AS), i.e. KS/AS, is preferably from 0.1 to 3.0, more preferably from 0.5 to 2.5, and even more preferably from 1.0 to 2.0, as determined by solid-phase microextraction-gas chromatography-mass spectrometry (SPME-GC/MS), from the viewpoint of suppression of staining in the machine, in particular, staining of a charging member.

Solid-phase microextraction (SPME) is a method of performing gas chromatography-mass spectrometry, including the steps of adsorbing chemical substance in a sample to a solid phase bound to a fine needle (referred to as fiber), inserting the needle into an inlet of GC/MS after adsorption, and heat-desorbing the chemical substance adsorbed to the solid phase. The generation of staining in the machine markedly takes place in a charging member, such as corotron or scorotron. In the present invention, the adsorption to a solid phase according to SPME under heating conditions at a temperature of 45° C. for 30 minutes after heating a sample at 180° C. for 10 minutes in advance is regarded to reproduce adsorption (staining) of a volatile component of a toner to a charging member caused by temperature elevation in the machine.

The ketone compound having 4 to 8 carbon atoms includes 2-butanone, 3-methyl-2-butanone, 3-buten-2-one, 2-pentanonediacetyl, 3-methyl-3-buten-2-one, 4-methyl-2-pentanone, 3-methyl-2-pentanone, 2-hexanone, 4-methyl-2-hexanone, 2-heptanone, 3-methyl-2-heptanone, 4-methyl-2-heptanone, 6-methyl-2-heptanone, 5-methyl-2-heptanone, and the like.

The polyester for a toner of the present invention is obtained by polycondensing an alcohol component and a carboxylic acid component, using the alcohol component and a carboxylic acid component containing an alkylsuccinic acid, an alkenylsuccinic acid, or a mixture thereof, each having 10 or more carbon atoms, as raw material monomers. The phrase "an alkylsuccinic acid, an alkenylsuccinic acid, or a mixture thereof, each having 10 or more carbon atoms" as used herein refers to a succinic acid substituted by an alkyl group having 10 or more carbon atoms, a succinic acid substituted by an alkenyl group having 10 or more carbon atoms, or a mixture thereof.

The alkylsuccinic acid and the alkenylsuccinic acid, each having 10 or more carbon atoms, are effective in improving low-temperature fixing ability and offset resistance. The alkylsuccinic acid or the alkenylsuccinic acid is contained in an amount, or in a total amount, when both are used together, of from 0.5 to 50% by mole, preferably from 5 to 40% by mole, and more preferably from 8 to 30% by mole, of the carboxylic acid component.

The alkylsuccinic acid having 10 or more carbon atoms includes undecylsuccinic acid, dodecylsuccinic acid, tridecylsuccinic acid, tetradecylsuccinic acid, pentadecylsuccinic acid, hexadecylsuccinic acid, heptadecylsuccinic acid, octadecylsuccinic acid, nonadecylsuccinic acid, and the like. Also, the alkenylsuccinic acid having 10 or more carbon atoms includes undecenylsuccinic acid, dodecenylsuccinic acid, tridecenylsuccinic acid, tetradecenylsuccinic acid, pentadecenylsuccinic acid, hexadecenylsuccinic acid, heptadecenylsuccinic acid, octadecenylsuccinic acid, nonadecenylsuccinic acid, and the like.

Among the alkylsuccinic acid and the alkenylsuccinic acid, each having 10 or more carbon atoms, an alkylsuccinic acid and an alkenylsuccinic acid, each having 11 to 13 carbon atoms, such as undecylsuccinic acid, dodecylsuccinic acid, tridecylsuccinic acid, undecenylsuccinic acid, dodecenylsuccinic acid, and tridecenylsuccinic acid, are preferable from the viewpoint of the prevention of staining in the machines. The alkylsuccinic acid or the alkenylsuccinic acid, each having 11 to 13 carbon atoms, is contained in an amount of preferably 70% by mole or more, more preferably 80% by mole or more, and even more preferably 85% by mole or more, of the alkylsuccinic acid, the alkenylsuccinic acid, or a mixture thereof, each having 10 or more carbon atoms.

A dicarboxylic acid component other than the alkylsuccinic acid and the alkenylsuccinic acid, each having 10 or more carbon atoms, includes an aromatic dicarboxylic acid such as phthalic acid, isophthalic acid, and terephthalic acid; an aliphatic dicarboxylic acid such as oxalic acid, malonic acid, maleic acid, fumaric acid, citraconic acid, itaconic acid, glutaconic acid, succinic acid, adipic acid, and a succinic acid substituted by an alkyl group having 1 to 9 carbon atoms or an alkenyl group having 2 to 9 carbon atoms, such as octylsuccinic acid; an acid anhydride thereof and an acid alkyl (1 to 3 carbon atoms) ester thereof, and the like. Among them, the aromatic dicarboxylic acid compounds are preferable, from the viewpoint of durability, fixing ability, and dispersibility of a colorant. The carboxylic acid, the anhydride of the carboxylic acid and the alkyl ester of the carboxylic acid are collectively referred to herein as a carboxylic acid compound.

The aromatic dicarboxylic acid compound is contained in an amount of preferably from 50 to 99.5% by mole, more preferably from 60 to 95% by mole, even more preferably from 60 to 92% by mole, and even more preferably from 70 to 92% by mole, of the dicarboxylic acid component.

A tricarboxylic or higher polycarboxylic acid component includes 1,2,4-benzenetricarboxylic acid (trimellitic acid), 2,5,7-naphthalenetricarboxylic acid, pyromellitic acid, and acid anhydrides thereof, lower alkyl(1 to 3 carbon atoms) esters thereof; and the like.

On the other hand, it is preferable that the alcohol component contains an alkylene oxide adduct of bisphenol A represented by the formula (I):

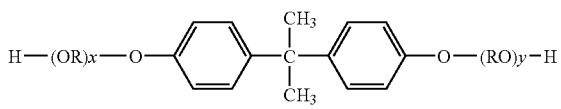

wherein RO is an alkylene oxide; R is an alkylene group having 2 or 3 carbon atoms; x and y are positive numbers showing an average number of moles of alkylene oxide added, wherein a sum of x and y is from 1 to 16, and preferably from 1.5 to 5, from the viewpoint of satisfying both fixing ability and durability.

Specific examples of the alkylene oxide adduct of bisphenol A represented by the formula (I) include polyoxypropylene(2.2)-2,2-bis(4-hydroxyphenyl)propane, polyoxyethylene(2.0)-2,2-bis(4-hydroxyphenyl)propane, and the like.

The above-mentioned alkylene oxide adduct of bisphenol A is contained in an amount of preferably 90% by mole or more, more preferably from 95 to 100% by mole, and even more preferably substantially 100% by mole, of the alcohol component.

A dihydric alcohol other than the above-mentioned alkylene oxide adduct of bisphenol A includes ethylene glycol, 1,2-propylene glycol, 1,4-butanediol, neopentyl glycol, polyethylene glycol, polypropylene glycol, hydrogenated bisphenol A, and the like.

A trihydric alcohol or higher polyhydric alcohol includes, for example, sorbitol, pentaerythritol, glycerol, trimethylolpropane, and the like.

It is preferable that the raw material monomer contains a trivalent or higher polyvalent monomer. The trivalent or higher polyvalent monomer, specifically, a trihydric alcohol or higher polyhydric alcohol, a tricarboxylic or higher polycarboxylic acid compound, or a mixture thereof, and preferably a tricarboxylic or higher polycarboxylic acid compound, is contained in an amount of preferably from 1 to 25% by mole, and more preferably from 5 to 20% by mole, of a total amount of the alcohol component and the carboxylic acid component, from the viewpoint of durability.

Further, the raw material monomer may properly contain a monohydric alcohol and a monocarboxylic acid compound within the range which would not impair the effects of the present invention, from the viewpoint of adjusting the molecular weight or the like.

The polyester can be obtained, for example, through the step of polycondensing an alcohol component and a carboxylic acid component at a temperature of from 180° to 250° C. in an inert gas atmosphere, optionally in the presence of an esterification catalyst. When the polyester of the present invention is produced, it is preferable the polycondensing step includes the step of forming an azeotrope with water in order to remove 6-methyl-2-heptanone, 5-methyl-2-heptanone, or the like which is causative of the source of staining in a resin.

Specifically, the process including the step of forming an azeotrope with water in the polycondensation reaction includes a process including the step of adding water to a reaction system at a temperature of from 100° to 300° C., during, after, or during and after the reaction of an alcohol component and an alkylsuccinic acid, an alkenylsuccinic acid, or a mixture thereof, each having 10 or more carbon atoms, in the process for producing a polyester for a toner including the step of polycondensing the alcohol component and the carboxylic acid component which contains the alkylsuccinic acid, the alkenylsuccinic acid, or a mixture thereof, each having 10 or more carbon atoms, in an amount of from 0.5 to 50% by mole.

The water to be added to the reaction system is in an amount of preferably from 0.1 to 50 parts by weight, more preferably from 0.5 to 40 parts by weight, and even more preferably from 1 to 30 parts by weight, based on 100 parts by weight of the resulting polyester.

The temperature in the reaction system at which water is added is preferably from 100° to 300° C., more preferably from 130° to 250° C., and even more preferably from 150° to 240° C., from the viewpoint of evaporation efficiency of water and viscosity of the reaction mixture.

The method of adding water to a reaction system is not particularly limited, and includes, for example, a method of mixing water in the form of a liquid and a reactant; a method of contacting water in the form of a liquid or gas (steam) with a reactant; and the like. A method of mixing water in the form of a liquid and a reactant at a temperature of preferably from 10° to 60° C., and more preferably from 15° to 50° C., is desired, and a method of blowing steam at a temperature of preferably from 100° to 260° C., and more preferably from 120° to 180° C. into a reactant, is more desired. In a bubbling method such as a method of blowing air or nitrogen, when viscosity of a resin is high, each bubble becomes larger and there is no interaction between the bubble and the resin, so that a sufficient efficiency is not obtained. When steam is blown thereinto, it is expected that steam is allowed to expand and diffuse because the temperature of steam is lower than that of the reactant, and consequently, fine bubbles are allowed to diffuse extensively and homogeneously, or to evaporate involving a low-boiling point substance in the resin during expansion and diffusion.

The pressure inside the reaction system when adding water is preferably from 4 to 100 kPa, more preferably from 6 to 90 kPa, and even more preferably from 20 to 60 kPa, from the viewpoint of efficient diffusion of water.

The rate of adding water to the reaction system is preferably from 0.002 to 0.5 parts by weight/min, more preferably from 0.008 to 0.3 parts by weight/min, and even more preferably from 0.008 to 0.2 parts by weight/min, based on 100 parts by weight of the resulting polyester.

Staining in the machines which is an objective of the present invention is presumably caused by impurities contained in the alkylsuccinic acid, the alkenylsuccinic acid, or a mixture thereof or a decomposed product thereof formed by pyrolysis of a part of the alkylsuccinic acid, the alkenylsuccinic acid, or a mixture thereof during a reaction of the polyester, and especially, the latter is regarded as the main cause because staining in the machines takes place markedly when the reaction temperature is high. Therefore, it is preferable that the step of adding water to the reaction system is carried out at a point or after the temperature reaches to the highest point in the entire polycondensation reaction, and it is more preferable that the step of adding water is carried out at a temperature lower than the highest temperature after passing the highest temperature of the entire polycondensation reaction, from the viewpoint of the suppression of pyrolysis.

Therefore, it is preferable that the polycondensation reaction of the polyester of the present invention is carried out in at least two stages of reaction temperatures, and it is more preferable that the polycondensation reaction is carried out at a reaction temperature lower than the highest temperature by at least one stage after the polycondensation reaction at the highest reaction temperature. The highest reaction temperature is preferably from 225° to 245° C. and more preferably from 230° to 240° C. On the other hand, the lower reaction temperature is preferably from 180° to 215° C. and more preferably from 200° to 210° C. Also, the difference between the highest reaction temperature and a reaction temperature after the highest reaction temperature is preferably from 20° to 60° C. and more preferably from 25° to 45° C., from the viewpoint of preventing an increase in staining substances due to pyrolysis.

The more preferred process for producing the polyester of the present invention includes a process including the steps of polycondensing an alkylsuccinic acid, an alkenylsuccinic acid, or a mixture thereof, each having 10 or more carbon atoms, at the highest reaction temperature as mentioned above, contacting, mixing, or contacting and mixing the reactant with water, and polycondensing a trivalent or higher polyvalent monomer, such as trimellitic acid having a comparably high reactivity, at a low reaction temperature as defined above. According to the process, a polyester in which impurities such as a ketone compound are reduced can be efficiently obtained while keeping a toll of the reaction time to its minimum.

The polyester for a toner of the present invention has a softening point of preferably from 70° to 170° C., more preferably from 80° to 160° C., and even more preferably from 90° to 155° C., from the viewpoint of low-temperature fixing ability, fixable region, and storage property of a toner. Also, the polyester has a glass transition temperature of preferably from 40° to 80° C., and more preferably from 50° to 65° C., from the viewpoint of low-temperature fixing ability and storage property of the resulting toner. The polyester has an acid value of preferably from 1 to 40 mgKOH/g, and more preferably from 2 to 30 mgKOH/g, from the viewpoint of chargeability and environmental stability of the resulting toner.

By using the polyester for a toner obtained by the present invention as a resin binder and mixing the polyester with a colorant or the like, a toner for electrophotography which is excellent in low-temperature fixing ability and offset resistance, and has reduced staining in the machine, is obtained. The polyester of the present invention is contained in an amount of preferably from 30 to 100% by weight, more preferably from 40 to 90% by weight, and even more preferably from 45 to 80% by weight, of the resin binder.

As the colorants, all of the dyes and pigments which are used as colorants for a toner can be used. The colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, Carmine 6B, Disazoyellow, and the like. The toner of the present invention can be either black toners or color toners. The colorant is contained in an amount of preferably from 1 to 40 parts by weight, and more preferably from 2 to 10 parts by weight, based on 100 parts by weight of the resin binder.

Raw materials in the toner other than the resin binder and the colorant include additives such as releasing agents, charge control agents, electric conductivity modifiers, extenders, reinforcing fillers such as fibrous substances, antioxidants, anti-aging agents, fluidity improvers, cleanability improvers, and the like.

The releasing agent includes an aliphatic hydrocarbon wax such as a low-molecular weight polypropylene, a low-molecular weight polyethylene, a low-molecular weight polypropylene-polyethylene copolymer, microcrystalline wax, paraffin wax, and Fischer-Tropsch wax, and oxides thereof; an ester wax such as carnauba wax, montan wax, and Sazole wax, and deoxidized waxes thereof; fatty acid amides; fatty acids; higher alcohols; metal salts of fatty acids; and the like. Among them, the aliphatic hydrocarbon wax is preferable, and the polypropylene wax is more preferable, from the viewpoint of releasing property and stability. The releasing agent is contained in an amount of preferably from 0.5 to 7.0 parts by weight, and more preferably from 1.0 to 4.0 parts by weight, based on 100 parts by weight of the resin binder.

The process for producing a toner may be any of conventionally known methods such as a kneading-pulverization method and an emulsion phase-inversion method. A pulverized toner is produced by, for example, mixing a resin binder, a colorant, an additive such as a releasing agent, and the like, homogenously with a mixer such as Henschel mixer, melt-kneading with a closed type kneader, a single-screw or twin-screw extruder, an open-roller type kneader or the like, cooling, pulverizing, and classifying the product. Further, fine inorganic particles such as hydrophobic silica, or fine resin particles may be added externally to the surface of the obtained toner. The toner has a volume-median particle size ($D_{50}$) of preferably from 3 to 15 μm. In the present invention, a volume-median particle size ($D_{50}$) refers to a particle size of which cumulative volume frequency is calculated on a volume percentage as 50% counted from the smaller particle sizes.

The toner containing the polyester of the present invention can be used alone as a developer in a monocomponent toner for development, or as a developer prepared by mixing the toner and a carrier in a two-component toner for development.

EXAMPLES

The following examples further describe and demonstrate embodiments of the present invention. The examples are given solely for the purposes of illustration and are not to be construed as limitations of the present invention.

[Softening Point]
The softening point refers to a temperature at which half the amount of the sample flows out when plotting a downward movement of a plunger against temperature, as measured by using a flow tester (CAPILLARY RHEOMETER "CF-500D," commercially available from Shimadzu Corporation), in which a 1 g sample is extruded through a nozzle having a diameter of 1 mm and a length of 1 mm while heating the sample so as to raise the temperature at a rate of 6° C./min and applying a load of 1.96 MPa thereto with the plunger.

[Glass Transition Temperature]
The glass transition temperature refers to a temperature of an intersection of the extension of the baseline of equal to or lower than the temperature of the endothermic highest peak and the tangential line showing the maximum inclination between the kick-off of the peak and the top of the peak, which is determined using a differential scanning calorimeter ("DSC 210," commercially available from Seiko Instruments, Inc.), by raising its temperature to 200° C., cooling the sample from this temperature to 0° C. at a cooling rate of 10° C./min, and thereafter raising the temperature of the sample at a heating rate of 10° C./min.

[Volume-Median Particle Size ($D_{50}$) of Toner]

Measuring Apparatus Coulter Multisizer II (commercially available from Beckman Coulter K.K.)

Aperture Diameter: 100 μm

Analyzing Software: Coulter Multisizer AccuComp Ver. 1.19 (commercially available from Beckman Coulter K.K.)

Electrolytic solution: "Isotone II" (commercially available from Beckman Coulter K.K.)

Dispersion: "EMULGEN 109P" (commercially available from Kao Corporation, polyoxyethylene lauryl ether, HLB: 13.6) is dissolved in the above electrolytic solution so as to have a concentration of 5% by weight, to provide a dispersion. Dispersion Conditions Ten milliliters of a test sample is added to 5 mL of the above dispersion, and the resulting mixture is dispersed in an ultrasonic disperser for 1 minute. Thereafter, 25 mL of the electrolytic solution is added to the dispersion, and the resulting mixture is dispersed in the ultrasonic disperser for another 1 minute, to provide a sample dispersion.

Measurement Conditions The above sample dispersion is adjusted so as to have a concentration at which the particle sizes of 30,000 particles can be determined in 20 seconds by adding 100 mL of the above electrolytic solution to the above sample dispersion. The particle sizes of 30,000 particles can be determined to obtain a volume-median particle size ($D_{50}$) from the particle size distribution.

Production Example 1 for RESIN

A 5 liter-four-neck flask equipped with a nitrogen inlet tube, a dehydration tube, a stirrer, and a thermocouple was charged with the raw material monomers shown in Table 1 other than trimellitic anhydride, and 4 g of tin octylate. The ingredients in the flask were reacted at 235° C. for 8 hours, and further reacted at 8.3 kPa at 235° C. for 1 hour. Thereafter, the temperature of the reaction mixture was lowered to 210° C., and the pressure was then changed back to normal pressure. Thereafter, trimellitic anhydride was added thereto, and the mixture was reacted until a desired softening point was reached, to provide resins A, F, and G.

Production Example 2 for Resin

The same procedures as in Production Example 1 for Resin were carried out except that after the ingredients in the flask were reacted at 8.3 kPa for 1 hour, the pressure was changed back to normal pressure, 300 mL of water at 40° C. was added dropwise to the reaction mixture at 235° C. over 1 hour while stirring, and the temperature of the mixture was lowered to 210° C. after dropwise addition, and trimellitic anhydride was then added thereto, to provide a resin B.

Production Example 3 for Resin

The same procedures as in Production Example 1 for Resin were carried out except that after the temperature of the reaction mixture was lowered to 210° C., 300 mL of water at 40° C. was added dropwise to the reaction mixture over 1 hour while stirring at 40 kPa, and the pressure was changed back to normal pressure after dropwise addition, and trimellitic anhydride was then added thereto, to provide a resin C.

Production Example 4 for Resin

The same procedures as in Production Example 1 for Resin were carried out except that after the temperature of the reaction mixture was lowered to 210° C., steam at 140° C. was blown into resin at a rate of 300 g/hr over 1 hour while stirring the reaction mixture at 20 kPa, and the pressure was changed back to normal pressure after blowing, and trimellitic anhydride was then added thereto, to provide a resin D.

Production Example 5 for Resin

The same procedures as in Production Example 1 for Resin were carried out except that after the ingredients in the flask were reacted at 8.3 kPa for 1 hour, 300 mL of water at 40° C. was added dropwise to the reaction mixture at 235° C. over 1 hour while stirring, and trimellitic anhydride was then added thereto at 235° C. after dropwise addition, to provide a resin E.

Resin A to E were subjected to thermal desorption-gas chromatography-mass spectrometry (TD-GC/MS) and solid-phase microextraction-gas chromatography-mass spectrometry (SPME-GC/MS) under the following measurement conditions to measure the contents of 6-methyl-2-heptanone and 5-methyl-2-heptanone according to TD-GC/MS, and a ratio of a total peak area attributed to ketone compounds having 4 to 8 carbon atoms (KS) and a peak area attributed to acetone (AS), i.e. KS/AS, according to SPME-GC/MS, respectively.

TD-GC/MS measurement is performed by injecting 5 μL of a 5 mg/L deuterated toluene/methanol solution standard into tube packed with Tenax TA, and weighing 10 mg of a sample.

<Measurement Conditions for TD>

Apparatus: Turbo Matrix ATD (Automatic thermal desorption (ATD) apparatus) commercially available from Perkin Elmer Analysis mode: 2-step desorption Injection: twice Conditions of thermal desorption from a tube: at 120° C. for 1 hour Conditions of adsorption to a trap tube: at −30° C. for 50 minutes Conditions of desorption from a trap tube: starting from −30° C. and heating at a rate of 40° C./min up to 300° C.

Purge time: 1 minute

Valve temperature: 300° C.

Transfer temperature: 300° C.

Column pressure: 150 kPa

Inlet split: 50 mL/min

Outlet split: 5 mL/min

Desorption: 50 mL/min

<Measurement Conditions for GC/MS>

GC apparatus: 6890N commercially available from Agilent Technologies

MS apparatus: 5973N commercially available from Agilent Technologies

Oven: Keeping at a temperature of 40° C. for 3 minutes, heating at a rate of 2° C./min up to 70° C., heating at a rate of 5° C./min up to 150° C., and heating at a rate of 10° C./min up to 300° C.

Column: HP5-MS (60 m×250 μm×0.25 μm)
  Constant pressure: 150 kPa (control from ATD)

MS: scan range m/z=40 to 460

Initial Area Reject: 0

Initial Peak Width: 0.097

Shoulder Detection: off

Initial Threshold: 12.0
  The quantification is performed by a single-point calibration of 5 mg/L deuterated toluene/methanol solution.

[Measurement Conditions for SPME-GC/MS]
  One gram of a sample is packed in a vial, and tightly sealed therein, the sample is heated in an oven at 180° C. for 10 minutes, and thereafter the heated sample is subjected to SPME-GC/MS.

SPME: Used fiber: Carboxen/PDMS
  Adsorption condition: 45° C., 30 min.

GC: Column: DB-WAX 60 m×0.25 mm
  Film: 0.25 μm

<SPME>
  Manufacturer: SUPELCO
  Used fiber: Carboxen™-PDMS 75 μm
  Model number: 57319

<GC>
  Manufacturer: Agilent Technologies
  Model number: HP6890 series GC System <MS>
  Manufacturer: Agilent Technologies
  Model number: 5973 Mass Selective Detector

TABLE 1

|  | Resin A | Resin B | Resin C | Resin D | Resin E | Resin F | Resin G |
|---|---|---|---|---|---|---|---|
| BPA-PO [1] | 1225 g (70) | 1225 g (70) | 1225 g (70) | 1225 g (70) | 525 g (30) | 1663 g (95) | 875 g (50) |
| BPA-EO [2] | 488 g (30) | 488 g (30) | 488 g (30) | 488 g (30) | 1138 g (70) | 81 g (5) | 813 g (50) |
| Terephthalic Acid | 374 g (45) | 374 g (45) | 374 g (45) | 374 g (45) | 415 g (50) | 664 g (80) | 540 g (65) |
| Dodecenylsuccinic Anhydride [3] | 402 g (30) | 402 g (30) | 402 g (30) | 402 g (30) | 335 g (25) | — | — |
| Trimellitic Anhydride | 240 g (25) | 240 g (25) | 240 g (25) | 240 g (25) | 240 g (25) | 48 g (5) | 288 g (30) |
| Softening Point (° C.) | 150.5 | 148.3 | 149.6 | 151.7 | 103.4 | 98.9 | 151.6 |
| Glass Transition Temp. (° C.) | 60.6 | 59.8 | 60.2 | 61.3 | 59.5 | 60.2 | 67.3 |
| Amount of 5-Methyl-2- |  |  | Below | Below |  |  |  |

TABLE 1-continued

| | | | | | | | |
|---|---|---|---|---|---|---|---|
| heptanone Detected (ppm) | 0.6 | 0.2 | detection limit (0.10 ppm) | detection limit (0.10 ppm) | 0.2 | — | — |
| Amount of 6-Methyl-2-heptanone Detected (ppm) | 1.5 | 0.2 | Below detection limit (0.10 ppm) | Below detection limit (0.10 ppm) | 0.4 | — | — |
| KS/AS | 5.2 | 2.2 | 1.5 | 1.2 | 2.7 | — | — |

Note) The amount in parenthesis is expressed as molar ratio when the total amount of the alcohol component is defined as 100 mole.
1) Polyoxypropylene(2.2)-2,2-bis(4-hydroxyphenyl)propane
2) Polyoxyethylene(2.0)-2,2-bis(4-hydroxyphenyl)propane
3) Compositions of Dodecenylsuccinic Anhydride

| | Numbers of Carbon Atoms of Substituent of Succinic Acid | | | | | | |
|---|---|---|---|---|---|---|---|
| | C9 | C10 | C11 | C12 | C13 | C14 | C15 |
| Compositional ratio (% by mole) | 5 | 8 | 13 | 73 | 1 | Below detection limit | Undetected |

Examples 1 to 4 and Comparative Examples 1 and 2

One-hundred parts by weight of a resin binder as shown in Table 2, 4 parts by weight of a colorant "MONARCH 880" (commercially available from Cabot Corporation), 0.5 parts by weight of a negative charge control agent "BONTRON E-84" (commercially available from Orient Chemical Co., Ltd.), and 2 parts by weight of a polypropylene wax "NP-055" (commercially available from MITSUI CHEMICALS, INC.) were sufficiently mixed with a Henschel mixer. Thereafter, the mixture was melt-kneaded using a co-rotating twin-screw extruder having an entire length of the kneading portion of 1560 mm, a screw diameter of 42 mm and a barrel inner diameter of 43 mm. The rotational speed of the roller was 200 r/min, the heating temperature within the roller was 120° C., the feeding rate of the mixture was 10 kg/h, and the average residence time was about 18 seconds. The resulting melt-kneaded product was rolled and cooled with a cooling roller, and thereafter finely pulverized with a jet mill, to provide a powder having a volume-median particle size ($D_{50}$) of 7.5 μm.

The amount 1.0 part by weight of "Aerosil R-972" (commercially available from Nippon Aerosil Co., LTD.) was added as an external additive to 100 parts by weight of the resulting powder, and the mixture was mixed with a Henschel mixer, to provide a toner.

Test Example 1

Low-Temperature Fixing Ability and Offset Resistance

A toner was loaded in a copy machine "AR-505" (commercially available from Sharp Corporation), and an unfixed image (2 cm×12 cm) with an amount of toner adhesion of 0.5 mg/cm² was obtained. The unfixed image obtained was subjected to a fixing test by fixing with a fixing device (fixing speed: 100 mm/sec) in a copy machine "AR-505" (commercially available from Sharp Corporation) which was modified to enable fixing of the unfixed image off-line, while sequentially raising the fixing temperature from 90° to 240° C. in increments of 5° C.

A sand-rubber eraser, of which bottom had a size of 15 mm×7.5 mm, to which a load of 500 g was applied was moved backward and forward five times over a fixed image obtained at each fixing temperature. Thereafter, the optical reflective densities of the fixed images before and after rubbing were measured with a reflective densitometer "RD-915" (commercially available from Macbeth Process Measurements Co.). The temperature of the fixing roller at which the ratio of the both optical reflective densities (after rubbing/before rubbing) initially exceeds 70% was defined as the lowest fixing temperature. The low-temperature fixing ability was evaluated in accordance with the following evaluation criteria. Also, the generation of the offset at each fixing temperature was visually observed, and the offset resistance was evaluated according to the following evaluation criteria. The sheets used for fixing were "CopyBond SF-70NA" (commercially available from Sharp Corporation, 75 g/m²). The results are shown in Table 2.

[Evaluation Criteria of Low-Temperature Fixing Ability]
  ⊚: Lowest fixing temperature being lower than 170° C.;
  ○: Lowest fixing temperature being 170° C. or higher and lower than 190° C.; and
  x: Lowest fixing temperature being 190° C. or higher.

[Evaluation Criteria of Offset Resistance]
  ○: Non-offset range being 80° C. or higher; and
  x: Non-offset range being lower than 80° C.

Test Example 2

Staining in the Machine

A toner was loaded in a copy machine "AR-505" (commercially available from Sharp Corporation). Fixed images having a blackened ratio of 5% were continuously printed for 5,000 sheets, and thereafter fixed solid images having sizes of 10 cm×15 cm were printed. The quality of the fixed solid images and the staining of a charging member were visually observed, and the staining in the machine was evaluated in accordance with the following evaluation criteria. The sheets used for printing fixed images having a blackened ratio of 5% were recycled paper sheets (45 g/m²), and those for printing fixed solid images were "CopyBond SF-70NA" (commercially available from Sharp Corporation, 75 g/m²), respectively. The results are shown in Table 2.

[Evaluation Criteria of Staining in the Machine]
  ⊚: Uniform solid image is obtained and no staining of a charging member is observed;
  ○: Some staining of a charging member is observed, but uniform solid image is obtained; and
  x: Staining of a charging member is observed, and some unevenness is generated on the solid image.

TABLE 2

|  | Resin Binder | Low-Temperature Fixing Ability | Offset Resistance | Staining in the Machine |
|---|---|---|---|---|
| Ex. 1 | Resin D/Resin F = 70/30 | ○ | ○ | ◎ |
| Ex. 2 | Resin C/Resin F = 80/20 | ○ | ○ | ◎ |
| Ex. 3 | Resin D/Resin E = 70/30 | ◎ | ○ | ○ |
| Ex. 4 | Resin B/Resin E = 90/10 | ◎ | ○ | ○ |
| Comp. Ex. 1 | Resin A/Resin F = 80/20 | ○ | ○ | X |
| Comp. Ex. 2 | Resin G/Resin F = 80/20 | X | X | ◎ |

It can be seen from the above results that the toners of Examples are excellent in low-temperature fixing ability and offset resistance, and also have reduced staining in the machine even though an alkylsuccinic acid having 10 or more carbon atoms, an alkenylsuccinic acid having 10 or more carbon atoms, or a mixture thereof is used. On the other hand, the toner of Comparative Example 1 containing a polyester of which amounts of 6-methyl-2-heptanone and 5-methyl-2-heptanone detected are not reduced generates staining in the machine, and the toner of Comparative Example 2 containing a polyester produced without using an alkylsuccinic acid and an alkenylsuccinic acid is disadvantageous in low-temperature fixing ability and offset resistance even though staining in the machine is not generated.

The polyester for a toner of the present invention is used as a resin binder or the like, for a toner used, for example, for developing electrostatic latent images formed in electrophotography electrostatic recording method, electrostatic printing method, or the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyester toner component, obtained by polycondensing an alcohol component and a carboxylic acid component containing an alkylsuccinic acid having 10 or more carbon atoms, an alkenylsuccinic acid having 10 or more carbon atoms, or a mixture thereof, in an amount of from 0.5 to 50% by mole, wherein each of 6-methyl-2-heptanone and 5-methyl-2-heptanone is detected in an amount of 0.5 ppm or less as determined by thermal desorption-gas chromatography-mass spectrometry.

2. The polyester toner component according to claim 1, wherein a ratio of a total peak area attributed to ketone compounds having 4 to 8 carbon atoms (KS) and a peak area attributed to acetone (AS), i.e. KS/AS, is from 0.1 to 3.0, as determined by solid-phase microextraction-gas chromatography-mass spectrometry.

3. The polyester toner component according to claim 1, wherein an alkylsuccinic acid having 11 to 13 carbon atoms, an alkenylsuccinic acid having 11 to 13 carbon atoms, or a mixture thereof, is contained in an amount of 70% by mole or more, of the alkylsuccinic acid having 10 or more carbon atoms, the alkenylsuccinic acid having 10 or more carbon atoms, or a mixture thereof.

4. The polyester toner component according to claim 1, comprising a trivalent or higher polyvalent monomer is contained in an amount of from 1 to 25% by mole of a total amount of the alcohol component and the carboxylic acid component.

5. The polyester toner component according to claim 1, wherein an alkylene oxide adduct of bisphenol A, represented by the formula (I):

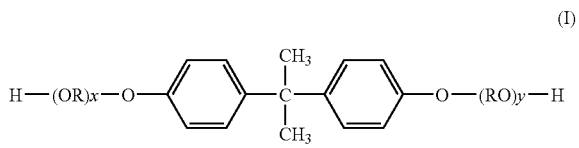

(I)

wherein RO is an alkylene oxide; R is an alkylene group having 2 or 3 carbon atoms; x and y are positive numbers showing an average number of moles of alkylene oxide, wherein a sum of x and y is from 1 to 16, is contained in an amount of 90% by mole or more, of the alcohol component.

6. A process for producing a polyester toner component, comprising
the step of polycondensing an alcohol component and a carboxylic acid component containing an alkylsuccinic acid having 10 or more carbon atoms, an alkenylsuccinic acid having 10 or more carbon atoms, or a mixture thereof, in an amount of from 0.5 to 50% by mole,
wherein water is added to a reaction system at a temperature of from 100° to 300° C. during, after, or during and after the reaction of an alcohol component and an alkylsuccinic acid having 10 or more carbon atoms, an alkenylsuccinic acid having 10 or more carbon atoms, or a mixture thereof, in an amount of from 0.1 to 50 parts by weight, based on 100 parts by weight of the polyester obtained.

7. The process according to claim 6, wherein each of 6-methyl-2-heptanone and 5-methyl-2-heptanone is detected in the resulting polyester in an amount of 0.5 ppm or less as determined by thermal desorption-gas chromatography-mass spectrometry.

8. The process according to claim 6, wherein water is added to the reaction system under a pressure of from 4 to 100 kPa.

9. The process according to claim 6, wherein the polycondensation reaction is carried out under at least two stages of reaction temperatures, wherein said reaction temperatures are (i) a temperature of from 225° to 245° C., and (ii) a temperature lower than the temperature in (i) by 20° to 60° C.

10. A toner comprising the polyester for a toner as defined in claim 1.

11. A toner comprising the polyester for a toner as defined in claim 2.

12. A toner comprising the polyester for a toner as defined in claim 3.

13. A toner comprising the polyester for a toner as defined in claim 4.

14. A toner comprising the polyester for a toner as defined in claim 5.

* * * * *